(12) United States Patent
Richter

(10) Patent No.: US 9,937,889 B2
(45) Date of Patent: Apr. 10, 2018

(54) VEHICLE PARTITION

(71) Applicant: Adrian Steel Company, Adrian, MI (US)

(72) Inventor: Thomas S. Richter, Sand Creek, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 15/440,870

(22) Filed: Feb. 23, 2017

(65) Prior Publication Data

US 2017/0247005 A1 Aug. 31, 2017

Related U.S. Application Data

(60) Provisional application No. 62/301,088, filed on Feb. 29, 2016.

(51) Int. Cl.
*B60R 21/02* (2006.01)
*B60J 1/00* (2006.01)

(52) U.S. Cl.
CPC ............ *B60R 21/026* (2013.01); *B60J 1/00* (2013.01)

(58) Field of Classification Search
CPC ......... B60R 21/026; B60J 1/004; B60J 1/005; B60J 1/006; B60J 1/007; B60J 1/008
USPC ...................... 296/24.4, 24, 42, 43
See application file for complete search history.

(56) References Cited

U.S. PATENT DOCUMENTS

| | | | |
|---|---|---|---|
| D246,304 S | 11/1977 | Horn | |
| 4,173,369 A | 11/1979 | Roggin | |
| 4,621,856 A | 11/1986 | McKenzie | |
| 4,938,518 A | 7/1990 | Willemsen | |
| 5,246,261 A | 9/1993 | McCormack | |
| 5,536,057 A | 7/1996 | Stewart | |
| 6,357,979 B1 * | 3/2002 | Montagna | B60R 21/026 410/121 |
| 6,419,301 B1 | 7/2002 | Tuerk | |
| 6,474,713 B1 | 11/2002 | Ruck et al. | |
| 7,318,614 B2 | 1/2008 | Steiger et al. | |
| D566,649 S | 4/2008 | Panasewicz et al. | |
| 7,731,255 B2 | 6/2010 | McJunkin | |
| 7,806,452 B2 | 10/2010 | Storer et al. | |
| 7,909,379 B2 | 3/2011 | Winget et al. | |
| 8,177,275 B2 | 5/2012 | Willis et al. | |
| 8,424,944 B2 * | 4/2013 | Rori | B60N 2/3013 296/193.07 |
| 8,690,216 B2 * | 4/2014 | Sage | B60R 21/12 296/24.42 |
| 8,708,388 B2 | 4/2014 | Setina | |
| 9,033,389 B2 | 5/2015 | Setina | |
| 9,174,685 B2 * | 11/2015 | Richter | B62D 33/042 |
| 9,415,663 B1 * | 8/2016 | Soffin | B60J 1/1853 |
| 2012/0187708 A1 | 7/2012 | White | |

* cited by examiner

*Primary Examiner* — Dennis H Pedder
(74) *Attorney, Agent, or Firm* — Marshall & Melhorn, LLC

(57) ABSTRACT

A partition for a vehicle is described. The partition separates the cargo area of the vehicle from the cab area of the vehicle. The partition may extend from floor to roof and from one side of the vehicle to the other side of the vehicle. The partition has a window so that the driver can see into the cargo portion. The window is positioned to ensure the driver can see through it in a variety of conditions.

13 Claims, 11 Drawing Sheets

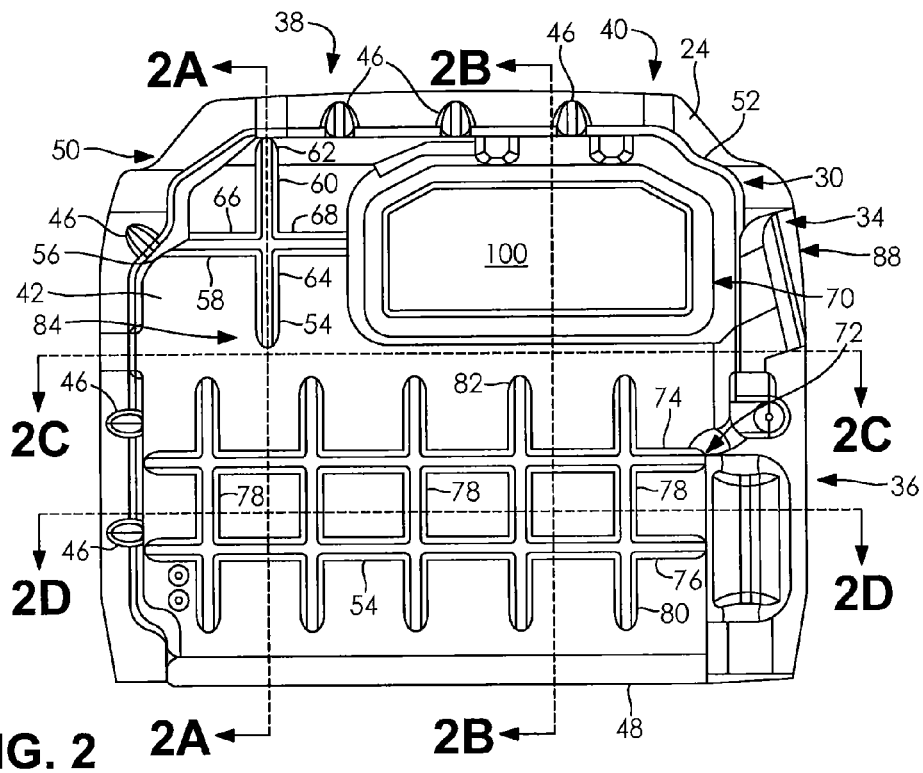
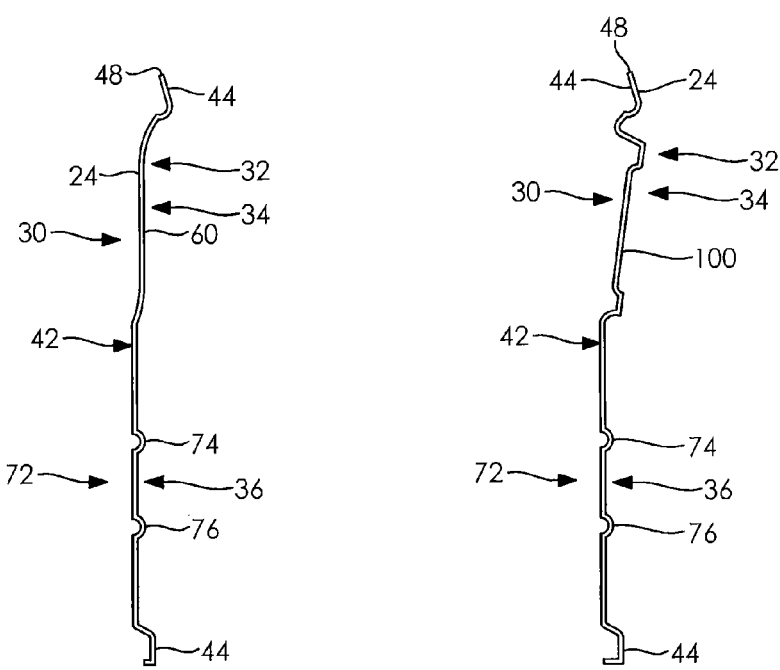
FIG. 2    FIG. 2A    FIG. 2B

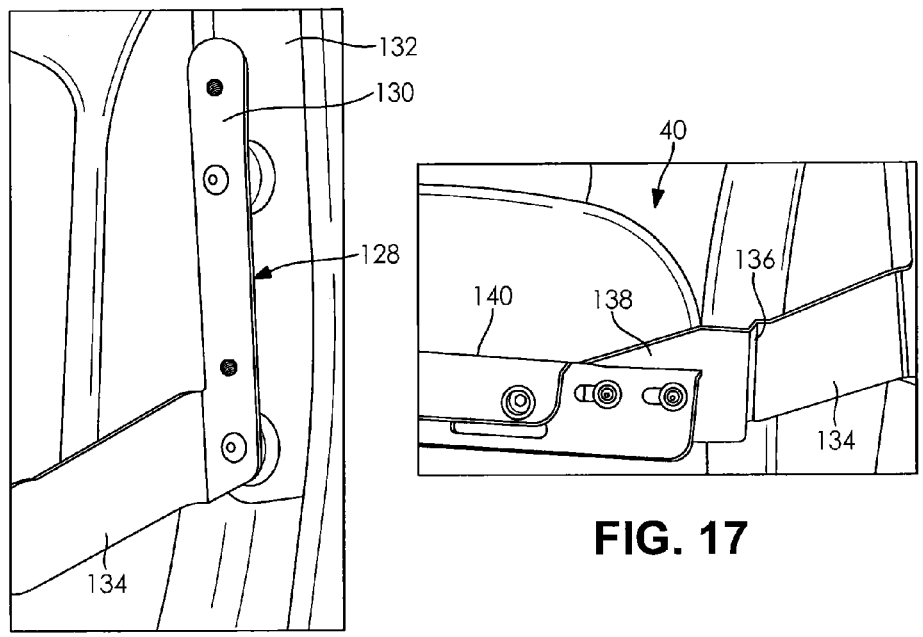
FIG. 16
FIG. 17
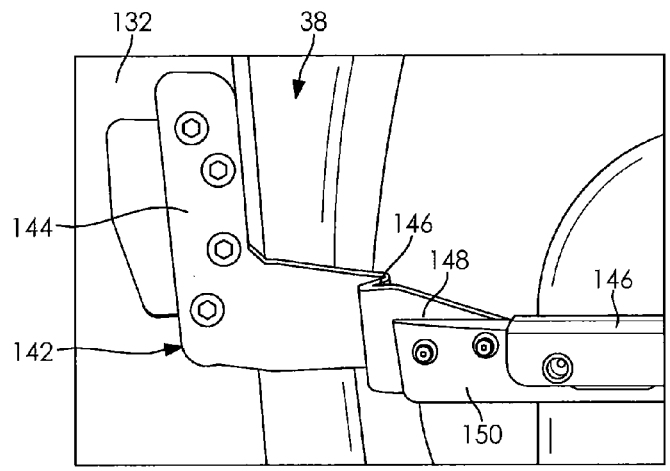
FIG. 18

VEHICLE PARTITION

FIELD OF THE DEVICE

Described herein is a partition for a vehicle. More particularly, the device relates to a partition that separates the cab area of a vehicle from the rest of the vehicle, such as from the cargo area of the vehicle.

BACKGROUND

Commercial vehicles and some passenger vehicles have been adapted to include an interior compartment partition to isolate the vehicle operator cab portion from a designated cargo or passenger portion. Generally, this was achieved by securing the partition to the vehicle B pillar and a structural roof bow of the vehicle so that a rigid partition can be created that protects the vehicle cab from, in the case of commercial vehicles, shifts in cargo that may cause loads to move from the cargo area to the cab area, and in the case of passenger vehicles, such as, for example police vehicles, isolates the passengers from the officers so that the passengers can be transported with minimal risk to the officers.

There is increasing complexity in the design of commercial and passenger vehicles. For example, with new vehicle safety systems, the B pillar has been used to store side impact air bags. In addition, side impact crash sensors and the accompanying control modules for such systems may also be stored in the B pillar. In the case of Lane Detection Systems, the B pillar is often utilized to store radar or lidar systems, as well as the accompanying control modules to provide alerts to the vehicle operator as necessary.

The wiring for vehicles has also increased in complexity. The roof bows, which used to provide structural support, are now also used as conduits wherein wiring is run to power the safety systems and for other systems within the vehicle.

The use of the B pillars and the roof bows for safety systems and wiring conduits has greatly reduced their ease of use as mounting structures for cargo partition systems. Indeed, mounting a cargo area partition to the roof bow may risk damaging the wiring that runs through the roof bows. Moreover, attaching a partition directly to the B pillar may damage the safety systems stored therein and further may interfere with the deployment of air bags stored in the B pillar.

In addition, vehicle Original Equipment Manufacturers (OEMs) discourage anyone from forming additional holes in the B pillars or other vehicle structures. The OEMs have found that when holes are formed in these structures that the debris from the holes can interfere with other systems. By way of example, debris from a hole drilled into a B pillar can find its way into the seat belt retractors, which are often located in the base of the B pillar. The debris in the retractors can cause them to not work properly or even fail.

In view of the above, there is a need for a cargo or vehicle compartment partition that is rigidly mountable to a vehicle and that does not interfere with the vehicle wiring or the vehicle safety systems and does not require locating additional unplanned holes in the vehicle structure.

SUMMARY OF DEVICE

A partition for separating a cargo side from a cab side of a vehicle has a cargo side and a cab side opposite the cargo side. The partition also has an upper portion and a lower portion beneath the upper portion. The partition also has a body portion and a perimeter flange continuously extending about the body portion. The perimeter flange extends from said body portion in a different vertical plane than the body portion. A window portion is provided in the partition. The window portion has a window located therein that is non-planar with the body portion.

BRIEF DESCRIPTION OF THE DRAWINGS

The advantages of the present device will become readily apparent to those skilled in the art from the following detailed description when considered in the light of the accompanying drawings in which:

FIG. 2 is a rear view of the partition of FIG. 1;

FIG. 2A is a section view along line 2A-2A of FIG. 2;

FIG. 2B is a section view along line 2B-2B of FIG. 2;

FIG. 16 depicts a curb side mounting bracket for the partition;

FIG. 17 depicts a portion of the curb side mounting bracket and a cross channel bracket; and FIG. 18 depicts a road side mounting bracket and the other side of the cross channel bracket from FIG. 17.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 10:
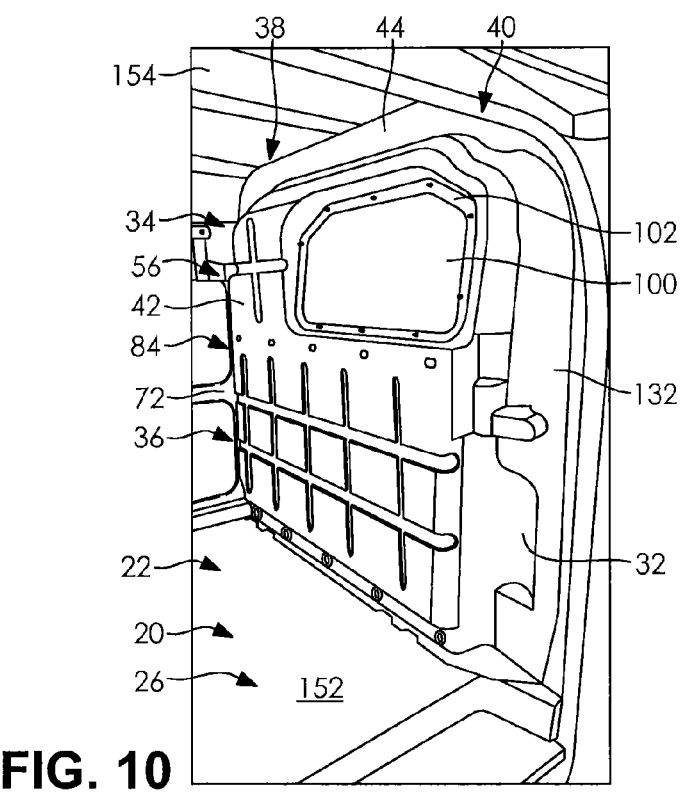
FIG. 10 is one embodiment of the partition located in a vehicle as seen from the cargo portion.
Figure 11:
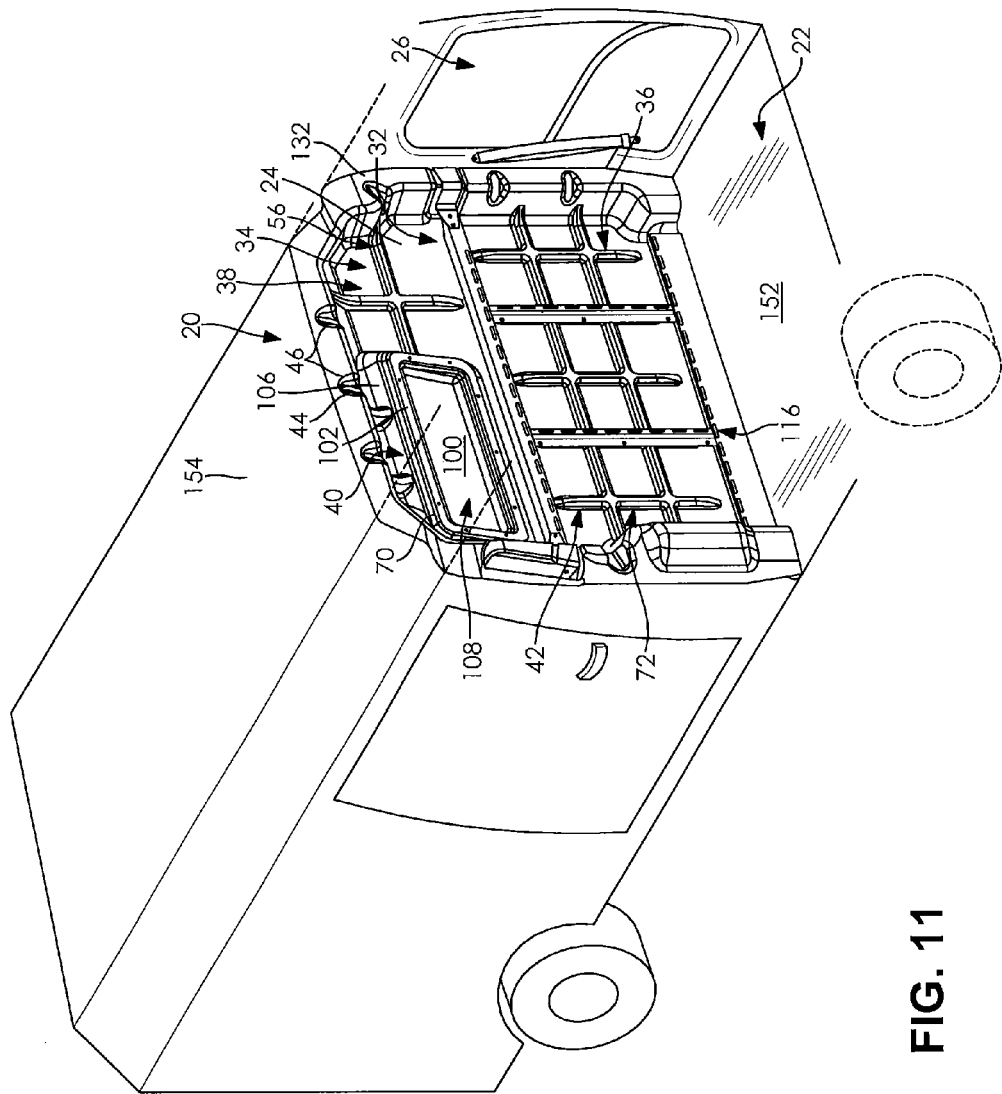
FIG. 11 is one embodiment of the partition located in a vehicle as seen from the cab portion.

Turning now to the drawings, and particularly to FIGS. 10 and 11, which depict one embodiment of a vehicle 20 in cutaway view depicting a vehicle interior space 22 having a partition 24 separating the vehicle interior space 22 into a cargo side 26 and a cab or passenger side 28. It can be appreciated that while FIGS. 10 and 11 depict the partition 24 in one type of vehicle 20, and in one location within that vehicle 20, the size and shape of the partition 24 can be adapted for use in other vehicles and in other locations for the vehicles.

The partition 24 has a cargo side 26, a cab side 28, an upper portion 34, a lower portion 36 and two side portions. One side portion is on the driver's side of the vehicle and is the driver's side portion 38 and the other side portion is on the curb side of the vehicle and is the curb side portion 40. The driver's side is also called the road side. The curb side is also called the passenger side.

Turning now to FIGS. 1-5, one embodiment of the partition 24 for a vehicle 20 is depicted. The partition 24 is generally rectangular in shape having a width dimension greater than a height dimension. The shape and size of the partition 24 is dictated by the vehicle space in which the partition 24 will be located.

The partition 24 comprises a body portion 42 and a perimeter flange 44 that extends about the body portion 42. Preferably, the body portion 42 and the perimeter flange 44 are unitary, one piece and integrally formed with one another. The body portion 42 and perimeter flange 44 can be molded, or otherwise formed, at the same time out of the same material. The partition 24 may be formed of ABS, but other materials are permissible. For example, the partition 24 may be formed from urethane impregnated with fiberglass.

Preferably, the perimeter flange 44 continuously surrounds the body portion 42 without interruption. The perimeter flange 44 extends radially outward from the body portion 42. By way of example, the perimeter flange 44 may extend substantially transverse from the body portion 42.

Flanges 46, which are unitary, integrally formed and one piece with the partition 24, support the perimeter flange 44 with respect to the body portion 42 at the preferred angle. More particularly, the flanges 46 connect the body portion 42 with the perimeter flange 44 with angled sections of material. The flanges 46 are located at intervals from one another about a perimeter 48 of the partition 24. Preferably, there are at least two flanges 46 connecting the body portion 42 with the perimeter flange 44 on a side of the partition, such as the road side, and at least two flanges connecting the body portion with the perimeter flange on the upper portion of the partition 24. As shown in the figures, a flange 46 may also be located on an upper corner 50 of the partition 24 on the driver's side portion 38.

The perimeter flange 44 is designed to receive mechanical fasteners, brackets, footers, headers, flanges, and/or channels that are used to secure the partition 24 to the vehicle 20.

The perimeter flange 44 extends in primarily a first vertical plane. The body portion 42 extends primarily in a second vertical plane. The first and second vertical planes are substantially parallel one another but they are horizontally offset from one another. The planes are offset from one another by an extension portion 52. The extension portion 52 continuously connects the perimeter flange 44 to the body portion 42 substantially without interruption. The horizontal offset provided by the extension portion 52 varies about the partition perimeter 48. As can be appreciated by the figures, the body portion 42 is offset from the perimeter flange 44 in the direction toward the cargo side 26 of the vehicle 20 and away from the cab side 28. The flanges 46 connect the perimeter flange 44 portion with the extension portion 52. More particularly, each flange 46 has one end unitary and integrally formed with the perimeter flange 44 and one end unitary and integrally formed with the extension portion 52.

The axial length of the extension portion 52 may vary for a partition 24 depending on the vehicle. However, regardless of the vehicle design, the extension portion 52 is designed to provide space for the driver's seat (and the passenger's seat) on the cab side 28 of the partition 24. More particularly, the extension portion 52 ensures that the seats on the cab side 28 of the vehicle 20 can move back and forth, and recline, as needed for driver and passenger use and comfort. In addition, the extension portion 52 is designed to provide clearance between the back of the driver/passenger and the body portion 42 so that the driver/passengers do not come in contact with the body portion 42.

The partition 24 also comprises reinforcing ribs 54. The ribs 54 are unitary, one-piece and integrally formed at least with the body portion 42. The ribs 54 increase the surface area of the partition 24 and the bends that create the ribs 54 add strength to the partition 24. The ribs 54 are formed to run in more than one direction, such as transverse to one another, in the partition 24.

As shown in the figures, all of the ribs 54 formed into the partition 24 extend toward the cab side 28. In other words, each of the ribs 54 form concave surfaces on the cargo side 26 of the partition 24 and each of the same ribs 54 form convex surfaces on the cab side 28 of the partition 24, which can be appreciated from FIGS. 10 and 11.

In the depicted embodiment, a first rib set 56 is provided in the upper portion 34 of the partition 24. The first rib 56 set is comprised of a first horizontal rib 58 that intersects with a first vertical rib 60 to form a cross-like structure.

An upper end 62 of the first vertical rib 60 extends to the extension portion 52. A lower end 64 of the first vertical rib 60 extends into the body portion 42 of the partition 24. The upper and lower ends 62, 64 of the first vertical rib 60 are vertically aligned with one another. Together, they form a continuous rib/groove.

A driver's side 66 of the first horizontal rib 58 extends to the extension portion 52 of the partition 24. An inboard side 68 of the first horizontal rib 58 extends to a window portion 70. The driver's side 66 and the inboard side 68 are horizontally aligned with one another. Together, they form a continuous rib/groove.

A second rib set 72 is provided below the first rib set 56 and below the window portion 70. The second rib set 72 comprises a first continuous horizontal rib 74 and a second continuous horizontal rib 76. The ribs 74, 76 are substantially parallel one another but offset from each other by a fixed vertical distance. The first and second continuous horizontal ribs 74, 76 extend from the driver's side portion 38 across the body portion 42 to the curb side portion 40.

The second rib set 72 also comprises a plurality of continuous vertical ribs 78. In the depicted embodiment, there are 5 vertical ribs 78, but the invention is not limited to 5 ribs 78 as more or less can be used. The vertical ribs 78 are substantially transverse to the horizontal ribs 74, 76. The vertical and horizontal ribs 74, 76 intersect one another to form a plurality of cross-like shapes.

A bottom portion of each vertical rib 80 extends almost to the extension portion 52. A top portion of each rib 82 extends almost to the first rib set 56 and/or the window portion 70. A vertical gap 84 exists between the first and second ribs sets 56, 72, as well as between the window portion 70 and the second rib set 72.

As maybe seen in FIG. 2, the perimeter flange 44 on the curb side portion 40 of the partition 24 may have a larger axial dimension than the perimeter flange 44 on the driver's side portion 38; the height of this perimeter flange portion may go up the uppermost horizontal rib 76 of the second rib set 72. More specifically, a lower corner, curb side portion 86 of the partition 24 may be used for equipment storage. While a wide variety of equipment might be located therein, one example of equipment may be such as a portable fire extinguisher.

With particular reference to FIGS. 2 and 2A-2D, a cross-sectional profile of the partition 24 at various locations is provided. The profiles depict at least the planar nature of the body portion 42, the offset (and planar) nature of the perimeter flange 44 with respect to the body portion 44 (i.e., the perimeter flange 44 is in another plane than the body portion 42), the depth, spacing and locations of the ribs 58, 60, 74, 76, 78, and the angled nature of the window portion 70 with respect to the body portion 44, which is described in more detail below.

In addition, from FIGS. 2 and 2A-2D, the unitary nature of the partition 24 can be appreciated as well as the uniform thickness of the partition 24. More particularly, with regard to thickness, it can be seen that the partition 24 has a uniform thickness throughout the body portion 42, the perimeter flange 44 and the window portion 70. With regard to the body and perimeter flange portions 42, 44, the partition 24 is only a single wall thickness.

With continuing reference to FIGS. 1-5, and new reference to FIGS. 6-11, the window portion 70 will now be described. The window portion 70 is located in an upper curb side portion 88 of the partition 24. The window portion 70 comprises an opening in the partition 24. The opening is defined by interior edges 90 in the partition 24. As can be appreciated from the figures, an upper edge 92 of the opening is located axially toward the cab side 28 while a lower edge 94 of the opening is located axially toward the cargo side 30. In other words, the upper edge 90 and the lower edge 94 are not vertically aligned with one another— they are separated by an axial gap. The upper and lower edges 92, 94 are parallel one another.

To accommodate the misalignment of the upper and lower edges 92, 94, the side edges 98 are angled. More particularly, the side edges 98 are angled into the cab side 32 from the lower edge 94 to the upper edge 92. The side edges 98 are parallel one another.

The edges 92, 94, 98 surrounding the window opening are axially offset from the body portion 42 by a window extension portion 96. The window extension portion 96 extends continuously about the perimeter of the opening, but its depth varies about the opening. As can be appreciated from FIG. 9, the window extension portion 90 is at its maximum along the upper edge 92 and at its minimum along the lower edge 94. The window extension portion 96 tapers from the upper edge 92 to the lower edge 94 along each side 98.

The edges 92, 94, 98 define a generally rectangular shaped opening, however, other shapes and designs are permissible.

A window 100 is located into the opening. The window 100 has an edge portion 102 that extends continuously about a perimeter 104 of the window 100. Mechanical fasteners may be located through the edge portion 102 into the partition body portion 42 to secure the two together.

The window 100 permits the vehicle operator and/or passengers in on the cab side 28 to see into the cargo side 26. In addition, for vehicles equipped with rear windows or windows in the sides of the cargo area, the window permits a view through these windows as well.

A flange portion 106 extends between the edge portion 102 and a main viewing area 108 of the window 100. The depth of the flange portion 106 varies as it extends about the window 100. More particularly, the flange portion 106 has its narrowest dimension along an upper edge 110 of the window 100 and it has its thickest dimension along the lower edge 112 of the window 100. Thus, as can be appreciated from the foregoing, the width of the flange portion 106 along the sides 114, connecting the upper edge 110 and the lower edge 112, changes. In particular, the thickness of the flange portion 106 increases downwardly from the upper edge 110 to the lower edge 112. This has the result of orienting the main viewing area 108 of the window at an angle with respect to vertical.

Figure 1:
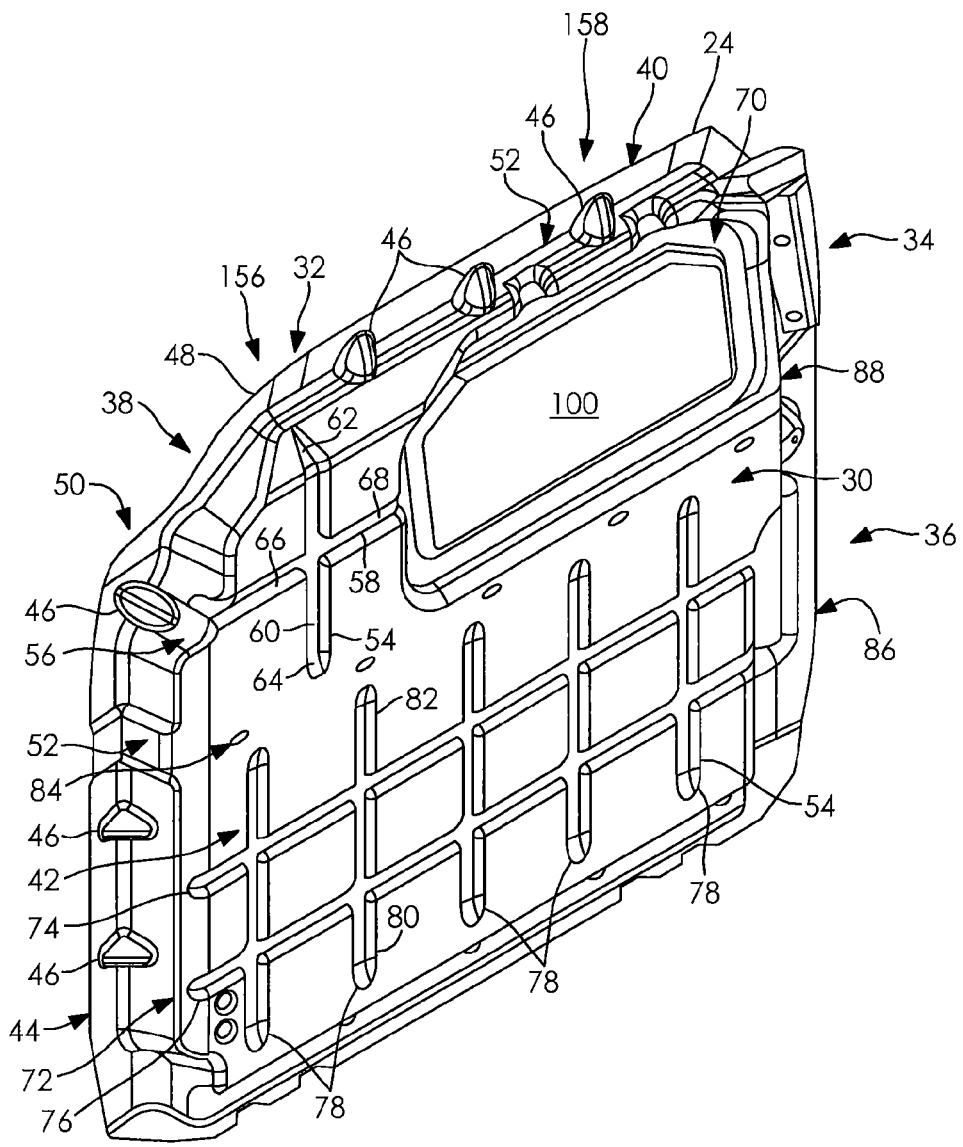
FIG. 1 is a perspective view of one embodiment of a partition.
Figure 2C:
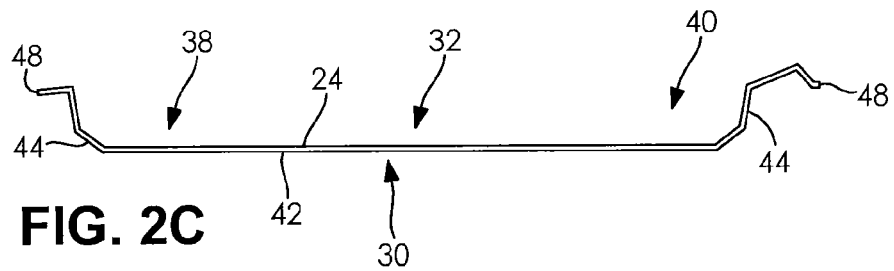
FIG. 2C is a section view along line 2C-2C of FIG. 2.
Figure 2D:
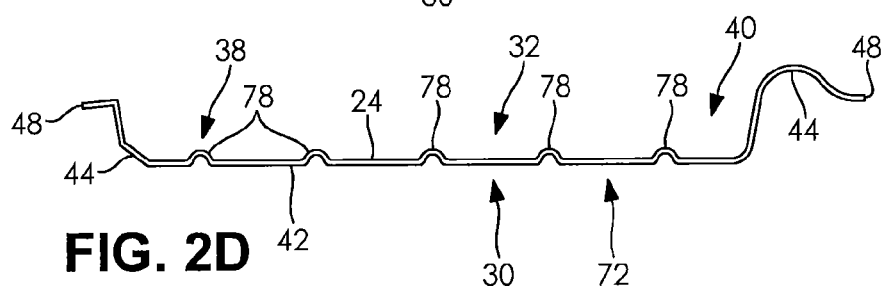
FIG. 2D is a section view along line 2D-2D of FIG. 2.
Figure 3:
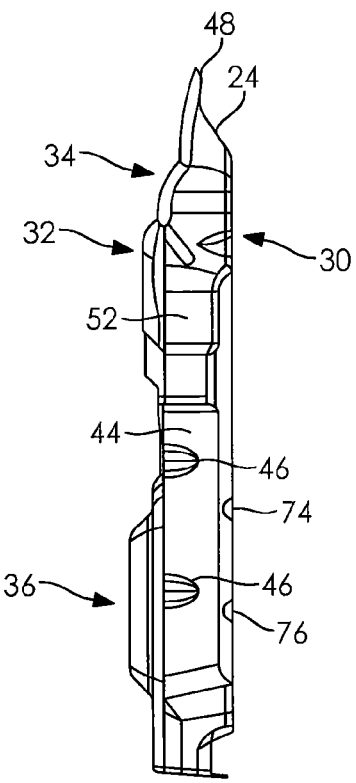
FIG. 3 is a side view on the driver's side of a vehicle of the partition of FIG. 1.
Figure 4:
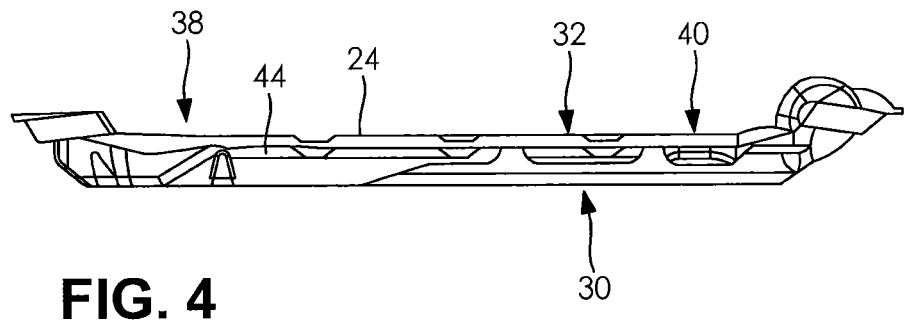
FIG. 4 is a top view of the partition of FIG. 1.
Figure 5:
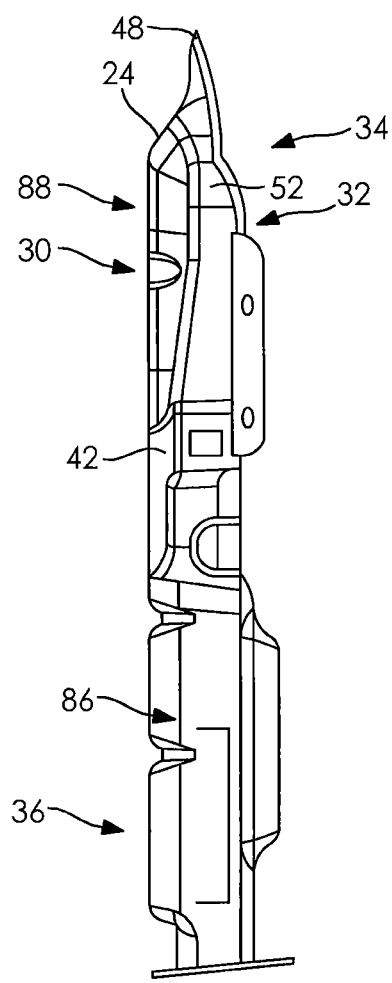
FIG. 5 is a side view on the passenger's side of a vehicle of the partition of FIG. 1.
Figure 6:
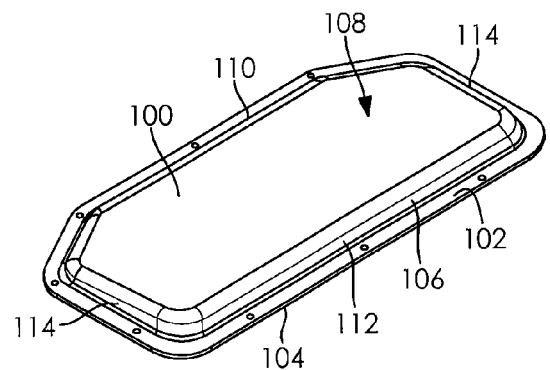
FIG. 6 is a perspective view of one embodiment of a window in the partition of FIG. 1.
Figure 7:
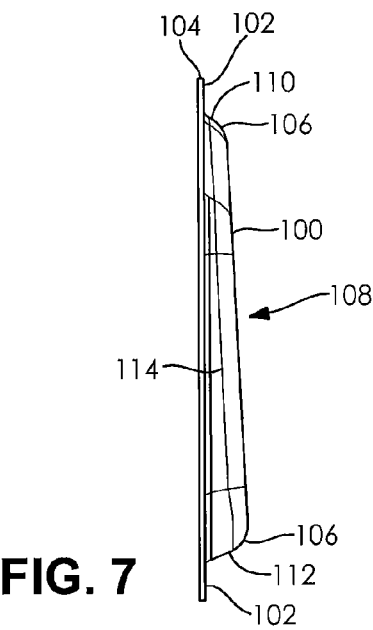
FIG. 7 is a side view of the window of FIG. 6.
Figure 8:
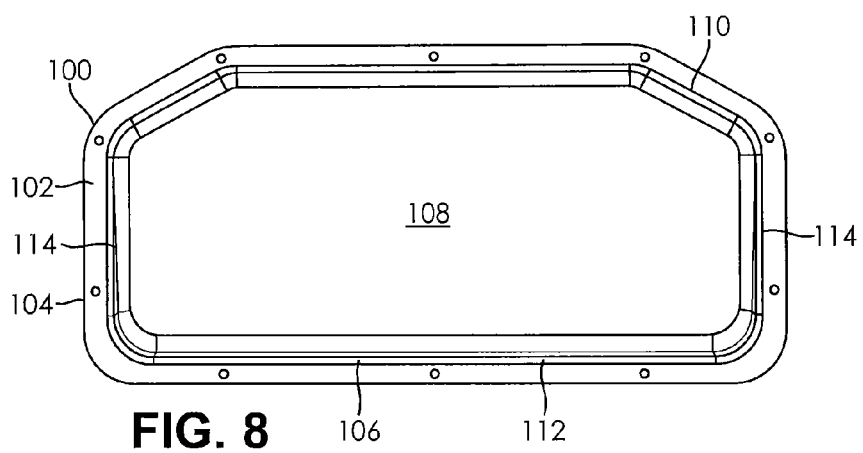
FIG. 8 is a plan view of the window of FIG. 6.
Figure 9:
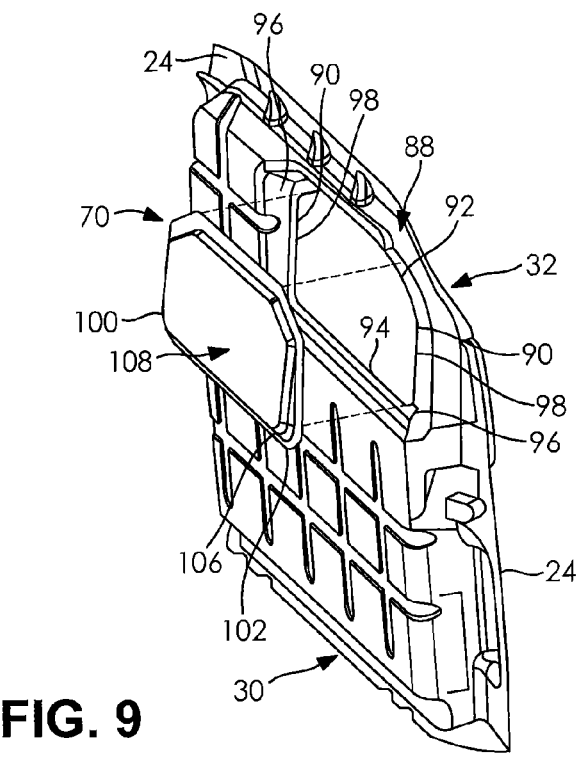
FIG. 9 is an exploded view of the window of FIG. 6 and the partition.

As can be appreciated by at least FIG. 9, the width of the window extension portion 96 of the partition 24 accommodates the angled nature of the window portion 70. Namely, the axial offset provided by the window extension portion 96 provides the partition 24 with sufficient axial depth to accommodate the angled window 100.

The main viewing area 108 of the window 100 is preferably angled with respect to the partition 24. More particularly, the main viewing area 108 of the window 100 is in a different plane than the plane for the body portion 42 of the partition 24. Preferably, the body portion 42 is generally perpendicular to a floor, ceiling and walls of the vehicle. It is preferred that the main viewing area 108 be located at an angle with respect to the body portion 42.

The main viewing area 108 is angled so as to reduce glare. It has been found that a window 100 that is planar with the partition body portion 42 produces a glare that can be difficult to see through. Additionally, or alternatively, it has been found that a planar window reflects oncoming or trailing light so as to produce a reflection in the rearview mirror and/or windshield of the vehicle. The reflection can be difficult to see through. As one example, headlights from an oncoming vehicle will produce a glare in a planar window, the rear view mirror and/or the windshield. Similarly, headlights from a trailing vehicle will produce a glare in the planar window, the rearview mirror and/or the windshield. In any of the instances, the glare can make it difficult, or impossible, to see through the window. However, when the main viewing area 108 of the window 100 is non-planar to the partition 24, the glare from either oncoming or trailing light is reduced or eliminated, and the window 100 does not undesirably reflect light onto the windshield or rearview mirror.

The window 100 is preferably constructed of a clear, translucent material. Preferably, the window 100 is unitary, integrally formed and one piece. In one embodiment, the window 100 is constructed of a polycarbonate material, however, the window is not limited to just this material.

Based on the foregoing, it can be appreciated the partition 24 does not possess either side-to-side or top to bottom symmetry. For example, the window portion 70 is located in the upper portion 34 on the curb side portion 40 and the first rib set 56 is located in the upper portion 34 on the driver's side portion 38.

It can also be appreciated that the cargo side 30 and the cab side 32 continuously extend from a floor portion 152 of the vehicle 20 to a roof portion 154 of the vehicle. The cargo side 30 and the cab side 32 also extend from one side 156 of the vehicle 20 to an opposite side 158 of the vehicle 20. The sides 156, 158 are directly connected to the floor portion 152 and the roof portion 154 and extend continuously from one to the other.

Figure 12:
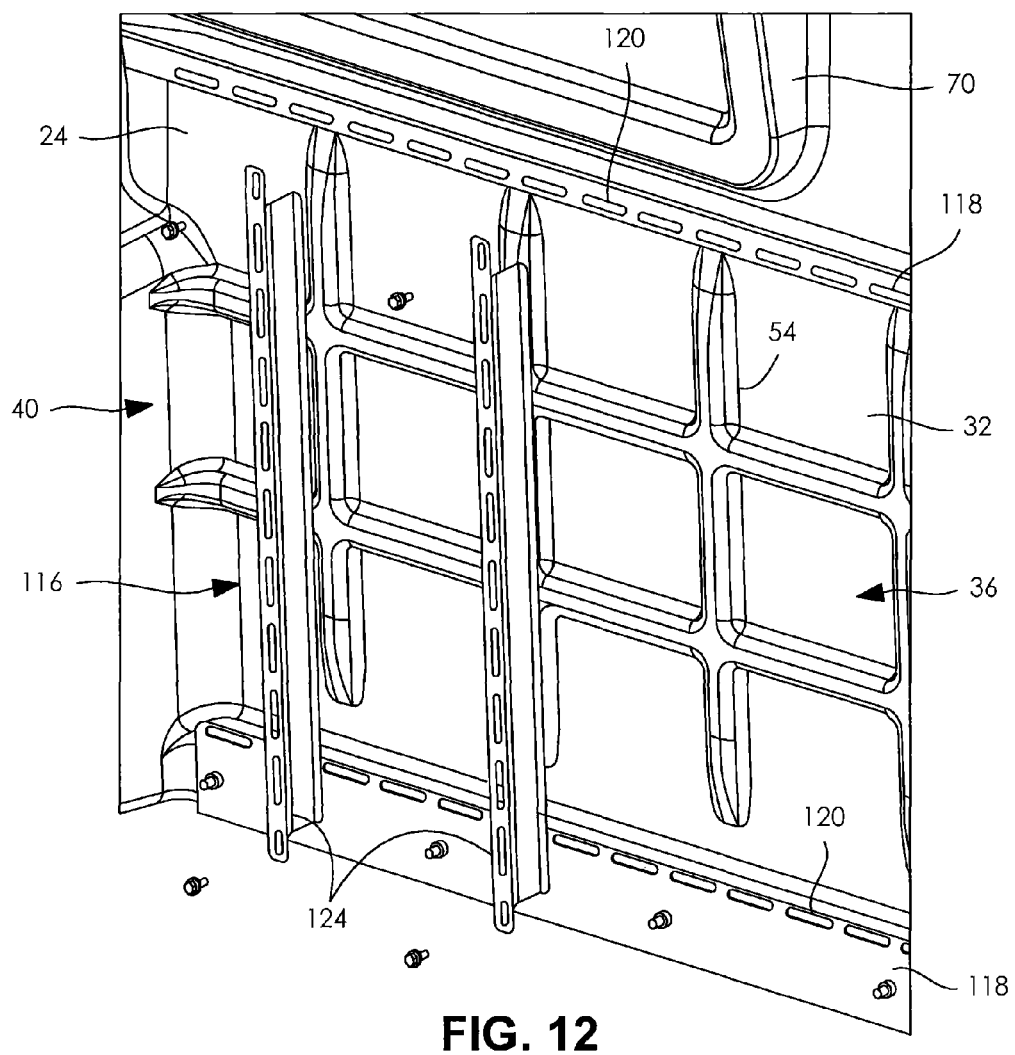
FIG. 12 depicts one embodiment of an accessory mounting system for the cab side of the partition.
Figure 13:
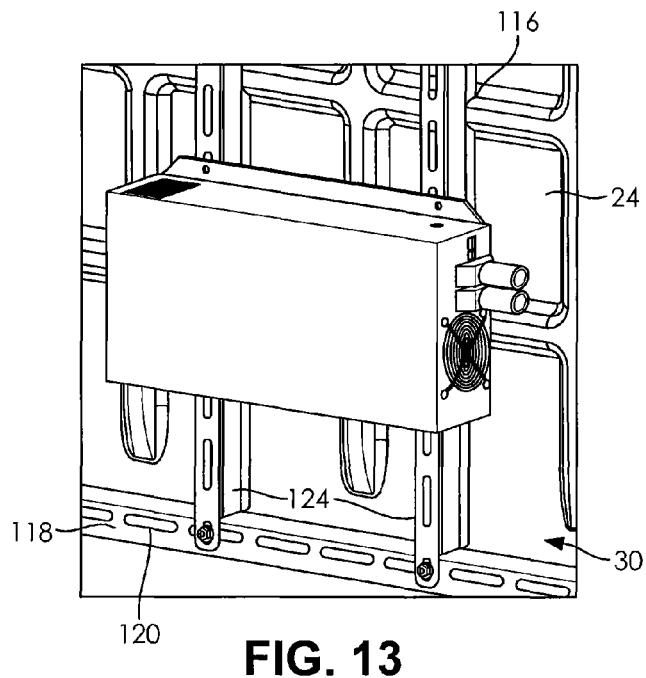
FIG. 13 depicts one embodiment of an accessory mounted to the mounting system of FIG. 12.

Turning now to FIGS. 12 and 13, one embodiment of an accessory mounting system 116 on the cab side 32 of the partition 24 is depicted. FIGS. 12 and 13 depict one embodiment of one system 116 in one location on the partition 24, however, additional systems 116 in various other locations may be used for various accessories.

In the depicted embodiment, the accessory mounting system 116 comprises two horizontal rails 118. The rails 118 have a plurality of fastener apertures 120 formed therethrough. The rails 118 are located adjacent fastener apertures (not shown) formed in the partition 24. More particularly, the partition 24 has a first row of apertures located beneath the second horizontal rib 76. The partition 24 has a second row of apertures beneath the window 100. The first rail 118 is positioned so that at least some of the rail apertures align with the first row of partition apertures. The second rail 118 is positioned so that at least some of the rail apertures align with the second row of partition apertures.

The accessory mounting system 116 also comprises at least two vertical rails 124. The rails 124 have a plurality of apertures formed therethrough. An upper aperture of each vertical rail 124 is aligned with a respective aperture in the upper horizontal rail 118. And, a lower aperture of each vertical rail 124 is aligned with a respective aperture in the lower horizontal rail 118. Mechanical fasteners are located through the apertures to secure them together and/or to secure the rails 118, 124 to the partition 24.

An accessory may be mounted to the vertical rails 124. The accessory may be secured, such as removably secured or permanently fixed, to the vertical rails 124 by mechanical fasteners. In FIG. 13, the accessory may be such as a power inverter, however, the invention is not limited to just mounting power inverters. Instead, all kinds of equipment, tools, files, etc. can be located on the accessory mounting system.

Figure 14:
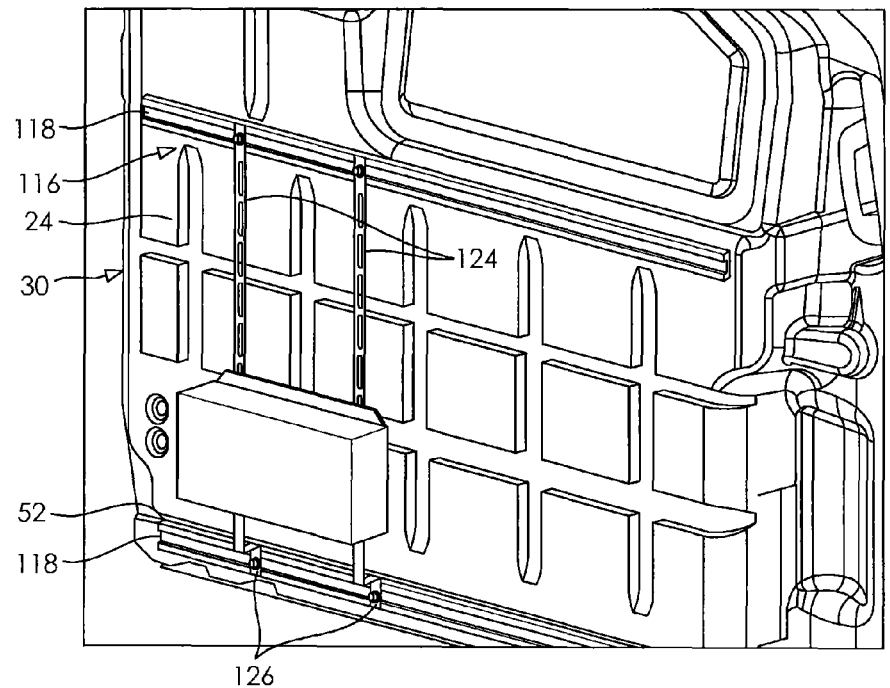
FIG. 14 depicts one embodiment of an accessory mounting system with an accessory mounted thereon for a cargo side of the partition.
Figure 15:
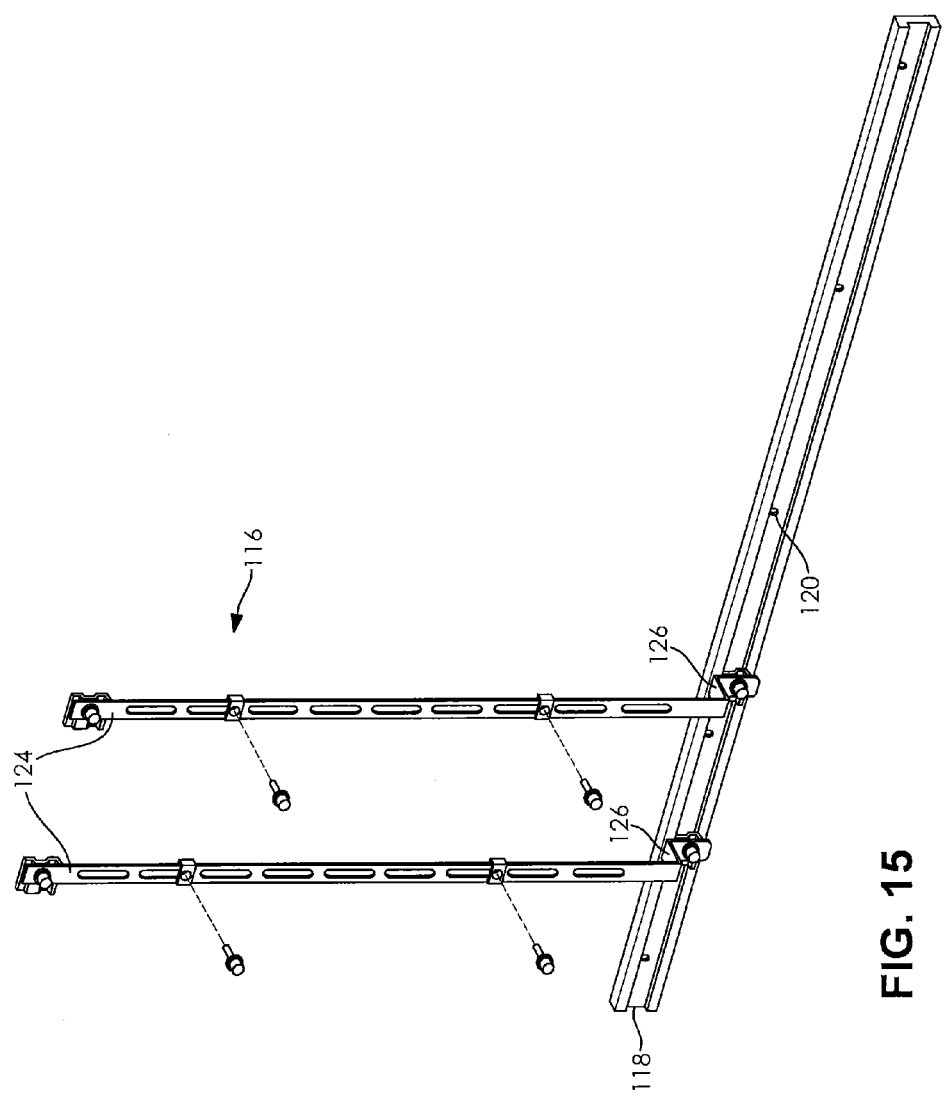
FIG. 15 depicts the accessory mounting system of FIG. 14.

A similar accessory mounting system 116 may be used to mount accessories to the cargo side 30 of the partition 24 as shown in FIGS. 14 and 15. Namely, the same types of horizontal rails 118, 124 may be used. The vertical rails 124, however, may have horizontal offsets 126 that accommodate the extension portions 52. With the horizontal rail 118 located in the perimeter flange 44, the horizontal offset 126 in the vertical rail 124 extends to meet the horizontal rail 118.

Turning now to FIGS. 16 and 17, one embodiment of a curb side bracket 128 is depicted. The curb side bracket 128 is unitary, one piece and integrally formed. The bracket 128 may be formed of metal, such as steel.

The bracket 128 has a mounting portion 130 that receives mechanical fasteners. The fasteners extend through the mounting portion 130 and into the B pillar 132 of the vehicle, such as, through pre-existing holes in the B-pillar. The bracket 128 has a first extension arm 134 that extends into the vehicle substantially transverse to the B pillar 132.

As shown in FIG. 17, the first extension arm 134 may be angled down from horizontal. A second extension arm 136 is connected to the first extension arm 134. The second extension arm 136 extends rearwardly from the first extension arm 134 and toward the cargo side 26 of the vehicle. The second extension arm 136 is transverse to the first extension arm 134. A third extension arm 138 is connected to the first extension arm 134. The third extension arm 138 is parallel to the first extension arm 134 and transverse to the second extension arm 136. The first and third extension arms 134, 138 are non-planar with one another.

A cross channel bracket 140 is connected to the third extension arm 138 with mechanical fasteners. As can be appreciated, from FIGS. 17-18, the cross channel bracket 140 extends from the curb side portion 40 to the driver's side portion 38. The cross channel bracket 140 may be a one-piece, continuous metal bar.

FIG. 18 shows the cross channel bracket 140 connected to a road side bracket 142. The two brackets 128, 142 may be connected together with mechanical fasteners.

One embodiment of a road side bracket 142 is depicted. The road side bracket 142 is unitary, one piece and integrally formed. The bracket 142 may be formed of metal, such as steel.

The bracket 142 has a mounting portion 144 that receives mechanical fasteners. The fasteners extend through the mounting portion 144 and into the B pillar 132 of the vehicle, switches through pre-existing holes in the B pillar 132. The bracket 142 has a first extension arm that extends into the vehicle substantially transverse to the B pillar 132.

A second extension arm 148 is connected to the first extension arm 146. The second extension arm 148 extends rearwardly from the first extension arm 146 and toward the cargo side 30 of the vehicle. The second extension arm 148 is transverse to the first extension arm 146. A third extension arm 150 is connected to the first extension arm 146. The third extension arm 150 is parallel to the first extension arm 146 and transverse to the second extension arm 148. The first and third extension arms 146, 150 are non-planar with one another.

The curb side bracket 128, the road side bracket 142 and the cross channel bracket 140 form a support system for the partition 24. Namely, the support system permits the partition 24 to be connected to the system, such as through mechanical fasteners. The support system helps to locate the partition 24 in the correct position and maintain that position within the vehicle.

While shapes, sizes and orientations of the support system are shown in the figures and described herein, it can be appreciated that these can change based on the size and shape of the vehicle the partition will be installed within.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A partition for separating a cargo side from a cab side of a vehicle, comprising:
    a cargo side;
    a cab side opposite said cargo side;
    an upper portion;
    a lower portion beneath said upper portion;
    a first side portion and a second side portion wherein said upper portion and said lower portion are continuous with said side portions;
    a body portion and a perimeter flange continuously extending about the body portion, wherein said perimeter flange extends radially outward from said body portion in a vertical plane with a horizontal offset from a vertical plane of said body portion by an extension portion;
    a window portion in said upper portion of said second side portion, wherein said window portion comprises an opening in said body portion, said opening defined by an upper edge of said body portion and a lower edge of said body portion, wherein said upper edge is axially offset from said lower edge; and
    a window located in said window portion, wherein said window is non-planar with said body portion.

2. The partition of claim 1, wherein said opening is defined by two side edges, wherein said side edges are angled from said lower edge to said upper edge into said cab side of said partition.

3. The partition of claim 2, wherein said side edges are parallel one another.

4. The partition of claim 2, wherein said side edges and said upper edge and said lower edge tilt said window toward cab side.

5. The partition of claim 1, wherein said first side portion is not symmetrical with said second side portion.

6. The partition of claim 1, wherein a plurality of reinforcing ribs are unitary, one-piece and integrally formed with the body portion.

7. The partition of claim 6, wherein said plurality of reinforcing ribs comprises a first rib set comprising a first horizontal rib intersecting with a first vertical rib in said upper portion.

8. The partition of claim 6, wherein said plurality of reinforcing ribs comprises a second rib set comprising first and second continuous horizontal and parallel ribs intersecting a plurality of continuous vertical ribs transverse to said horizontal ribs.

9. The partition of claim 1, wherein said body portion and perimeter flange are unitary, one-piece and integrally formed.

10. The partition of claim 1, further comprising a plurality of unitary, one-piece and integrally formed spaced apart flanges that connect said body portion and said perimeter flange.

11. The partition of claim 9, wherein said horizontal offset between said body portion and said perimeter flange varies about said body portion.

12. The partition of claim 1, wherein said body portion and said perimeter flange have a constant thickness and comprise a single wall.

13. The partition of claim 1, wherein said cargo side and said cab side continuously extend from a floor of a vehicle to a roof of said vehicle and from one side of said vehicle to an opposite side of said vehicle.

* * * * *